(12) United States Patent
Jazdzewski et al.

(10) Patent No.: US 9,047,407 B2
(45) Date of Patent: Jun. 2, 2015

(54) STATE CAPTURE AFTER EXECUTION IN DEPENDENT SEQUENCES

(75) Inventors: Charles P. Jazdzewski, Redmond, WA (US); Michael C. Fanning, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 684 days.

(21) Appl. No.: 13/329,130

(22) Filed: Dec. 16, 2011

(65) Prior Publication Data

US 2013/0159978 A1 Jun. 20, 2013

(51) Int. Cl.
*G06F 9/44* (2006.01)
*G06F 11/30* (2006.01)
*G06F 11/36* (2006.01)

(52) U.S. Cl.
CPC .................................. *G06F 11/3636* (2013.01)

(58) Field of Classification Search
None
See application file for complete search history.

(56) References Cited

U.S. PATENT DOCUMENTS

| | | | | |
|---|---|---|---|---|
| 6,594,744 | B1 * | 7/2003 | Humlicek et al. | 711/162 |
| 7,584,463 | B2 * | 9/2009 | Grieskamp et al. | 717/155 |
| 7,653,899 | B1 * | 1/2010 | Lindahl et al. | 717/128 |
| 7,840,787 | B2 * | 11/2010 | De Pauw et al. | 712/227 |
| 8,332,828 | B2 * | 12/2012 | Vargas | 717/137 |
| 8,555,250 | B2 * | 10/2013 | Fanning et al. | 717/120 |
| 8,789,018 | B2 * | 7/2014 | Fanning et al. | 717/123 |
| 8,869,106 | B2 * | 10/2014 | Jazdzewski et al. | 717/114 |
| 2008/0134142 | A1 | 6/2008 | Nathan et al. | |
| 2008/0216060 | A1 * | 9/2008 | Vargas | 717/137 |
| 2008/0288558 | A1 * | 11/2008 | De Pauw et al. | 707/202 |
| 2009/0024986 | A1 | 1/2009 | Meijer et al. | |
| 2009/0064091 | A1 | 3/2009 | Tonkin et al. | |
| 2010/0269095 | A1 | 10/2010 | King et al. | |
| 2011/0173597 | A1 | 7/2011 | Cascaval et al. | |
| 2012/0131547 | A1 * | 5/2012 | Muir | 717/109 |
| 2012/0311533 | A1 * | 12/2012 | Fanning et al. | 717/111 |
| 2013/0159976 | A1 * | 6/2013 | Jazdzewski et al. | 717/126 |

OTHER PUBLICATIONS

King, S., et al., "Debugging Operating Systems with Time-Traveling Virtual Machines," USENIX Annual Techinical Conference [online], 2005 [retrieved Jul. 25, 2014], Retrieved from Internet: <URL:https://www.usenix.org/legacy/events/usenix05/tech/general/king/king.pdf>, pp. 1-15.*
Cuadrado, et al., "Building Domain-specific Languages for Model-driven Development", in Proceedings of IEEE, Software, vol. 24, Issue 5, Sep.-Oct. 2007, pp. 48-55.
Haldiman, et al., "Practical, Pluggable Types for a Dynamic Language", in Journal of Computer Languages, Systems & Structures, vol. 35, Issue 1, Apr. 2009, 31 pages.
Prabala, Chandrasekhar, "Dynamic Language Runtime", in White Paper of Infosys, Feb. 2010, 10 pages.

* cited by examiner

*Primary Examiner* — Don Wong
*Assistant Examiner* — Todd Aguilera
(74) *Attorney, Agent, or Firm* — Kevin Sullivan; Aaron Hoff; Micky Minhas

(57) ABSTRACT

The execution of a dynamic code segment sequence that includes at least two code segments in sequence. The first code segment is first executed and the corresponding state of the environment is captured. The second code segment is then executed. When the second code segment is later re-executed, the first code segment is not re-executed again. Rather, the environmental state is set to be the captured state that existed when the first code segment originally executed. Then, the second code segment may be executed without spending the resources required to re-run the first code segment. This may be employed at authoring time, or after deployment time.

15 Claims, 8 Drawing Sheets

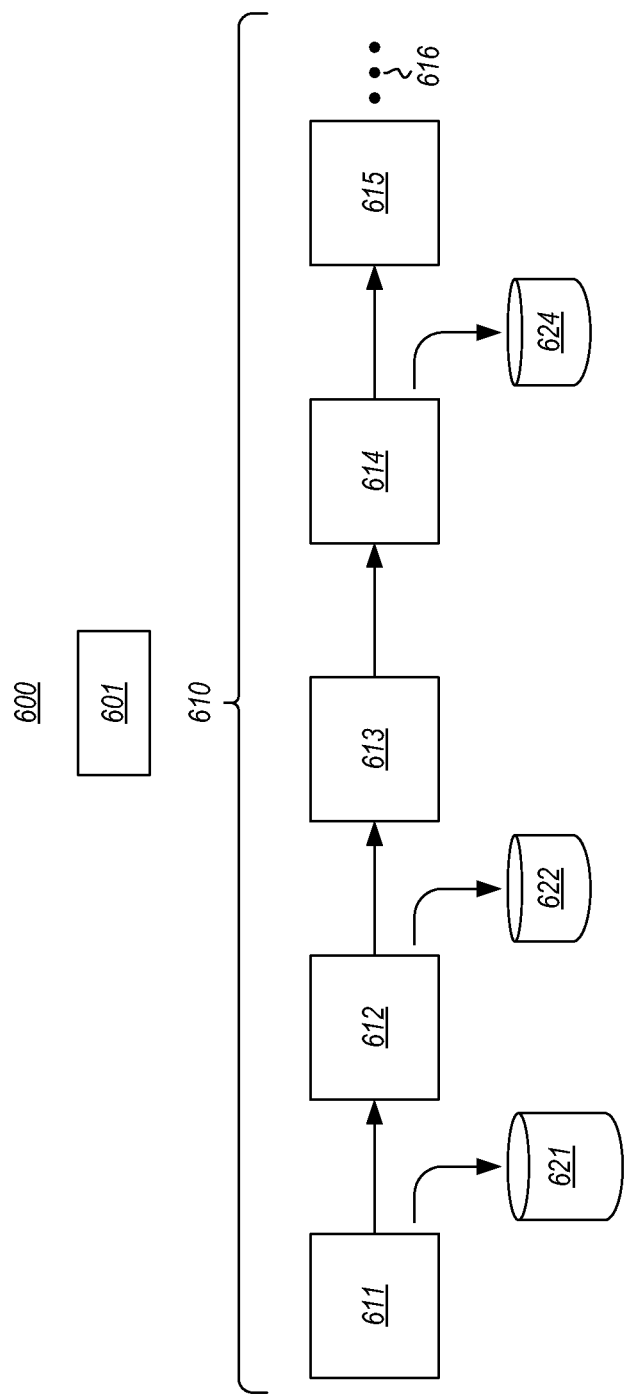

STATE CAPTURE AFTER EXECUTION IN DEPENDENT SEQUENCES

BACKGROUND

Software languages may be categorized as "dynamic languages" or "static languages". A fundamental characteristic of dynamic languages is that they lack a type system. Furthermore, dynamic languages often have dependencies regarding what other dynamic language programs should have run before initiation of the subject dynamic language program. For instance, suppose there was a dependency that program A was to first run, followed by program B. The completion of program A is a dependency from program A. If program B is to be run again, program A should be again run before the second instance of program B begins.

Execution of a dynamic language program may be performed under different circumstances. For instance, such a program might be run during runtime, when the program has actually been deployed. The program might also be run prior to runtime, during authoring time, in order to facilitate authoring.

BRIEF SUMMARY

At least one embodiment described herein relates to the execution of a dynamic code segment sequence that includes at least two code segments in sequence. The first code segment is first executed and the corresponding state of the environment is captured. The second code segment is then executed. When the second code segment is later re-executed, the first code segment is not re-executed again. Rather, the environmental state is set to be the captured state that existed when the first code segment originally executed. Then, the second code segment may be executed without spending the resources required to re-run the first code segment.

This may be helpful in a variety of scenarios. Three such scenarios are 1) at authoring or evaluation time, when the second code segment is run to a halt point, so that an available symbol set can be generated for that halt point to facilitate authoring or evaluation, 2) at evaluation or deployment time when second code segment may run multiple times, and 3) when an analysis of the captured environmental state is employed.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which:

FIG. 6 illustrates an environment in which a dynamic code sequence having at least five code segments is executed, and in which full capture, and incremental capture are employed;

DETAILED DESCRIPTION

In accordance with embodiments described herein, the execution of a dynamic code segment sequence that includes at least two code segments in sequence is described. The first code segment is first executed and the corresponding state of the environment is captured. The second code segment is then executed. When the second code segment is later re-executed, the first code segment is not re-executed again. Rather, the environmental state is set to be the captured state that existed when the first code segment originally executed. Then, the second code segment may be executed without spending the resources required to re-run the first code segment. This may be helpful in a variety of scenarios. Three such scenarios are 1) at authoring or evaluation time, when the second code segment is run to a halt point, so that an available symbol set can be generated for that halt point to facilitate authoring or evaluation, 2) at deployment or evaluation time when second code segment may run multiple times, and 3) when an analysis of the captured environmental state is employed.

Figure 1:
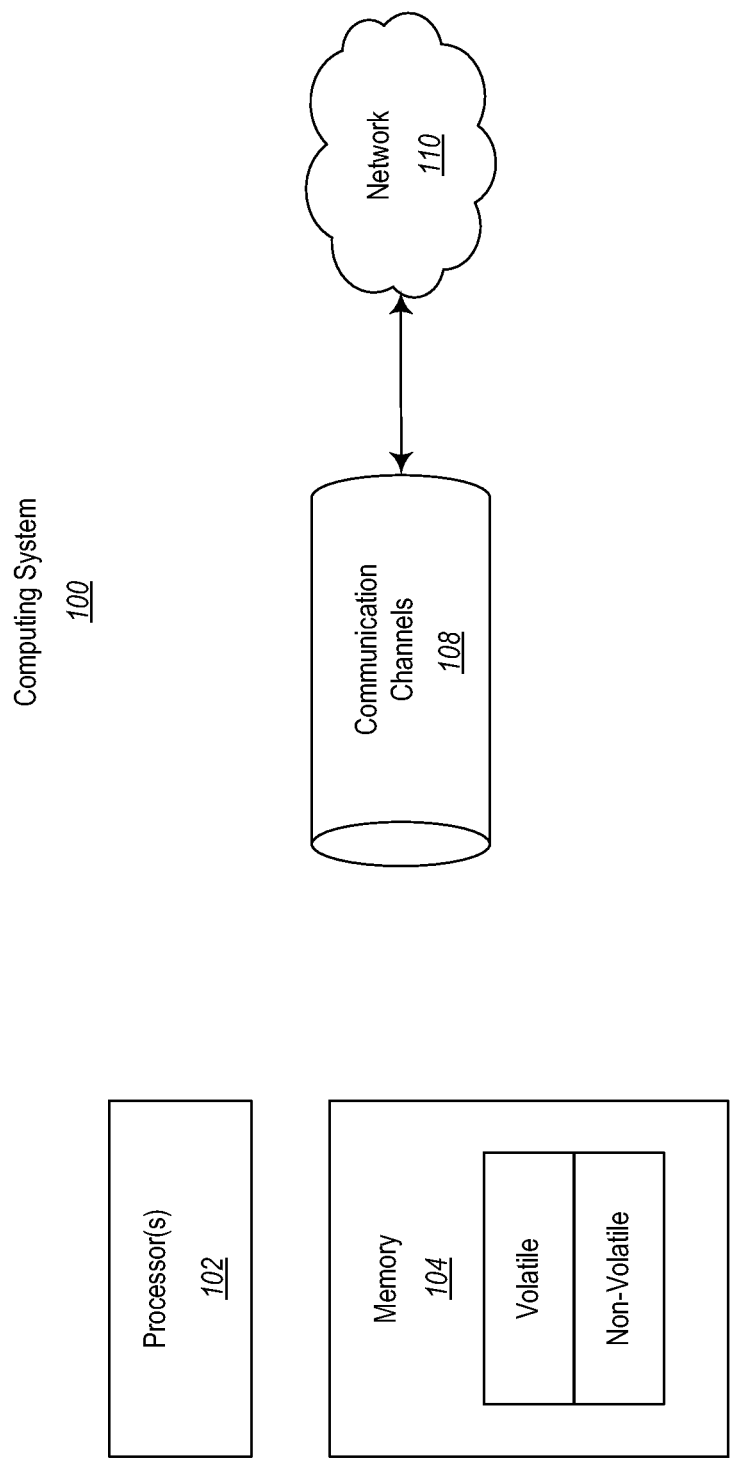
FIG. 1 illustrates an example computing system that may be used to employ embodiments described herein.

First, introductory discussion regarding computing systems is described with respect to FIG. 1. Computing systems are now increasingly taking a wide variety of forms. Computing systems may, for example, be handheld devices, appliances, laptop computers, desktop computers, mainframes, distributed computing systems, or even devices that have not conventionally been considered a computing system. In this description and in the claims, the term "computing system" is defined broadly as including any device or system (or combination thereof) that includes at least one physical and tangible processor, and a physical and tangible memory capable of having thereon computer-executable instructions that may be executed by the processor. The memory may take any form and may depend on the nature and form of the computing system. A computing system may be distributed over a network environment and may include multiple constituent computing systems.

As illustrated in FIG. 1, in its most basic configuration, a computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "module" or "component" can refer to software objects or routines that execute on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. An example of such an operation involves the manipulation of data. The computer-executable instructions (and the manipulated data) may be stored in the memory 104 of the computing system 100. Computing system 100 may also contain communication channels 108 that allow the computing system 100 to communicate with other message processors over, for example, network 110.

Embodiments described herein may comprise or utilize a special purpose or general-purpose computer including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer. In this description and in the claims, a "computer program product" includes one or more computer storage media having computer-executable instructions thereon that, when executed by the one or more processors of the computing system, perform the function of the computer program product.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 2:
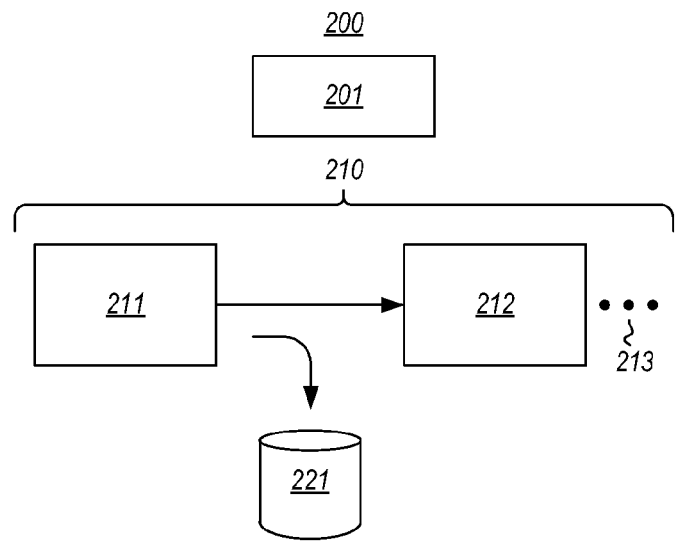
FIG. 2 illustrates an environment in which a dynamic code sequence having at least two code segments is executed.

FIG. 2 illustrates an environment 200 that may be implemented by the computing system 100 of FIG. 1. The environment 200 includes a dynamic code sequence 210 that includes multiple code segments that are to be executed in sequence. For instance, first code segment 211 is to be first executed followed by the second code segment 212. The ellipses 213 represent that the principles described herein are not limited to the number of code segments executed in sequence, as there may be three or more such code segments executed in sequence. Each dynamic code segment in the dynamic code sequence 210 may be a dynamic application program such as, perhaps a script file or other dynamic program file. Such dynamic language programs often have execution dependencies in which one code segment should not be run until all previous code segments in the sequence have been run. The dynamic code segment may, however, be any other code segment including, for example, code fragments that have been extracted from other files, code fragments that have been constructed in memory for whatever reason such as variable declarations in a global namespace, individual functions, and so forth.

After the first code segment 211 is executed, the computing system may capture all or a portion of environmental state 221 of the execution, prior to executing the second code segment 212. An execution manager 201 causes the computing system to execute the dynamic code segment sequence 210 in the environment in the proper sequence. As an example, the execution manager 201 may be instantiated in memory and/or operated as described herein in response to the processor(s) 102 of the computing system 100 executing computer-executable instructions embodied on computer-readable media or computer storage media constituting all or part of a computer program product.

Figure 3:
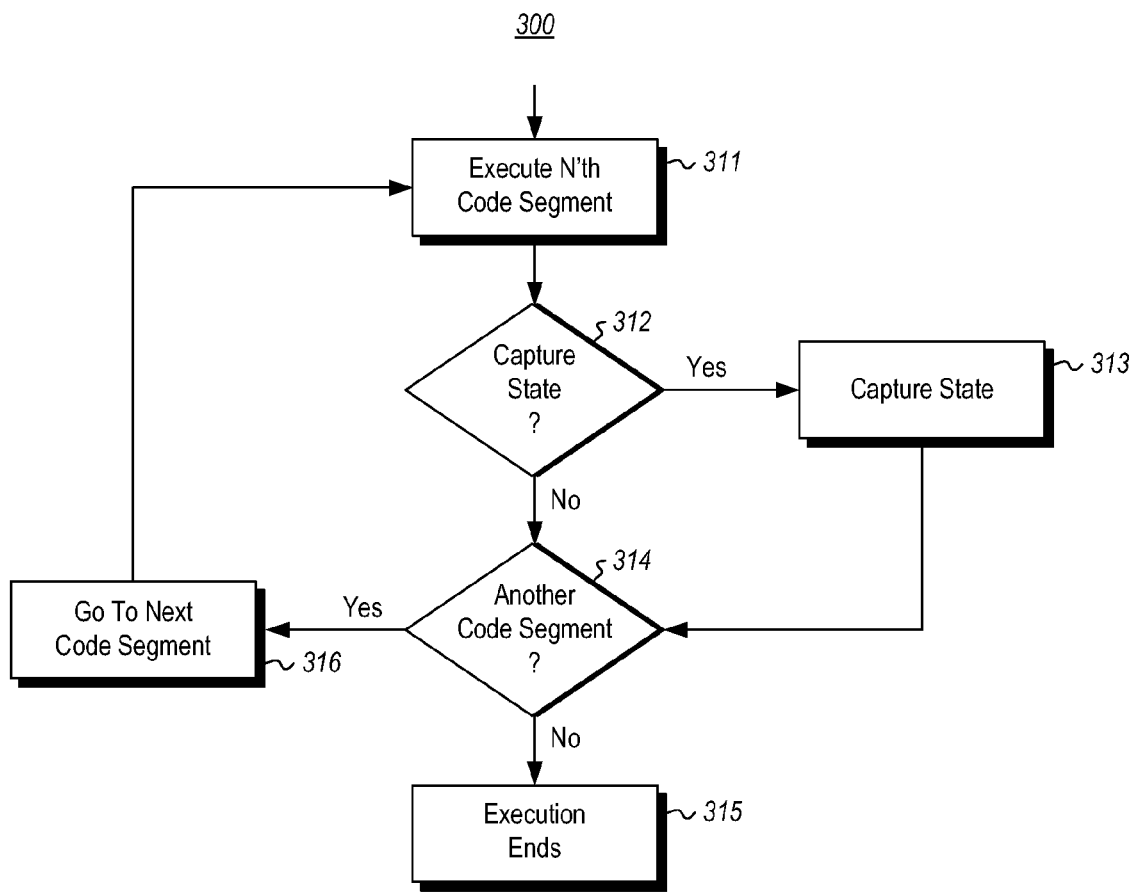
FIG. 3 illustrates a flowchart of a method of executing the sequence before capturing environmental state.

FIG. 3 illustrates a flowchart of a method 300 of executing the sequence before capturing environmental state. As the method 300 may be performed by the execution manager 201 of FIG. 2 with the execution sequence 210 of FIG. 2, the method 300 will now be described with frequent reference to the environment 200 of FIG. 2.

The N'th code segment is executed (act 311). "N" is an integer that is initially at 1. Accordingly, at this point the first code segment is executed. Referring to FIG. 2, the first code segment 211 is executed.

At this point, or previously, it is determined whether the execution environmental state is to be captured (decision block 312). If it is to be captured ("Yes" in decision block 312), then all or a portion of the environmental state of the execution as captured (act 313) as that state existed after having completed execution of the first code segment. For instance, referring to FIG. 2, environmental state 221 is captured. If the environmental state is not to be captured ("No" in decision block 312), or after the environmental state is captured (act 313) in the case that environmental state is to be captured ("Yes" in decision block 312), then it is determined whether or not there is another code segment to be executed (decision block 314). In some embodiments, environmental state is always to be captured after execution of each code segment, in which case decision block 312 would not exist. Instead, the state would just be captured (act 313) after executing the N'th segment (act 311).

If there are no more code segments to be executed ("No" in decision block 314), then the execution of the dynamic code sequence is completed (act 315). On the other hand, if there are more code segments to be executed ("Yes" in decision block 314), then execution proceeds to the next code segment (act 316), and the second code segment is executed (act 311). For instance, referring to FIG. 2, the execution manager 201 causes the second code segment 212 to execute and if appropriate capture the resulting environmental state (act 313). This continues until there are finally no further code segments in the dynamic code sequence ("No" in decision block 314).

There are a number of reasons why capturing environmental state may be helpful. As a first example, an analysis may be performed on the captured environmental state. It is typically quite difficult to perform static analysis of a dynamic language program. However, static analysis of captured environmental state caused by execution of the dynamic language program may reveal many features of the dynamic language program.

Figure 4:
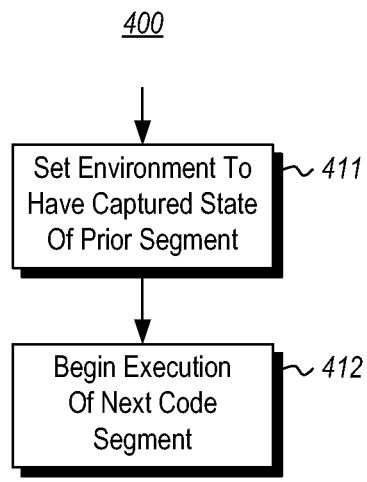
FIG. 4 illustrates a flowchart of a method of executing a dynamic code segment a subsequent time after environmental state has been captured.

FIG. 4 illustrates a flowchart of a method 400 of executing a dynamic code segment a subsequent time after environmental state has been captured. Again, the method 400 will be described with frequent reference to the environment 200 of FIG. 2. In this case, however, captured environmental state 221 preexists the performance of the method 400.

Rather than repeat execution of the first code segment 211, the method 400 instead sets the environment to have the captured previous environmental state (act 411). Then, the execution of the second code segment may begin (act 412). In many cases, this can occur faster than it would normally take to initiate execution of the second code segment 212 after having to execute the first code segment 211. Accordingly, as an alternative or in addition to providing the ability to perform analysis directly on the capture execution state, this also has the potential of improving execution efficiency in cases in which the dynamic code sequence is to be executed multiple times. This provides a benefit even after deployment of the dynamic code sequence in a software product, since it is common for dynamic code sequences to execute multiple times. However, this capture also has the potential to provide benefit at authoring time or when evaluating the correctness of authored code. After deployment time, the second code segment 212 would just complete execution. However, during authoring time or when evaluating correctness of the authored code, there may be a benefit to halt execution of the second code segment 212 at a particular halt point in order to generate an available symbol set to facilitate the authoring of the second code segment 212.

Figure 5:
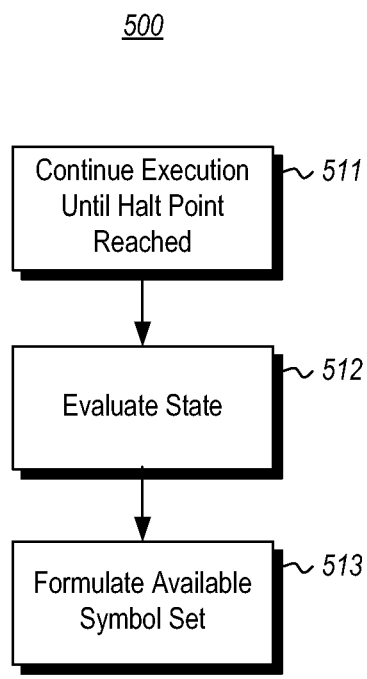
FIG. 5 illustrates a flowchart of a method for continuing execution of the second code segment to generate an available symbol set, and may be considered to a continuation of the method of FIG. 4.

FIG. 5 illustrates a flowchart of a method 500 for continuing execution of the second code segment during authoring time to generate an available symbol set, and may be considered to be a continuation of the method 400 of FIG. 4. Specifically, execution of the second code segment is continued until the code segment encounters a halt point (act 511). At that halt point, execution halts. Accordingly, the state of the execution is evaluated (act 512), and as a result, a completion list is generated (act 513). More regarding the generation of this available symbol set will be described further below. Nevertheless, suffice it to say for now that such an available symbol set may be useful in authoring the dynamic language program corresponding to the second code segment, and may be useful to evaluate the correctness of the authored code of the second code segment. Accordingly, since the method reaches the halt point faster that it would have without leveraging the capture execution state, the available symbol set may likewise be generated faster. This can save the user significant time as the author and evaluator are typically just waiting for the execution to reach the halt point. The time savings is multiplied if the method 500 is to be executed multiple times for multiple halt points, as might occur during authoring, or perhaps when evaluating correctness of multiple specific points in the authored code.

FIG. 6 illustrates an example environment 600 in which the execution manager 601 (which may operate as described for the execution manager 201 of FIG. 2) manages execution of a larger dynamic code sequence 610. In particular, the dynamic code sequence 610 includes five code segments 611 through 615, but with ellipses 616 showing that there may be more segments in this example. The method 300 of FIG. 3 will now be described with respect to the example environment 600 of FIG. 6.

The first code segment 611 is executed (act 311). At this point, or previously, it is determined whether the execution environmental state is to be captured (decision block 312). This determination might be made based on any criteria. As an example, the execution manager 601 might determine that the execution state should be captured based on whether the first code segment 611 has undergone a code change, such as a change in an object or module within the first code segment 611.

If the execution environmental state is to be captured ("Yes" in decision block 312), then all or a portion of the environmental state of the execution is captured (act 313) as that state existed after having completed execution of the first code segment. For instance, referring to FIG. 6, environmental state 621 is captured. In this case, since this was the first capture of environmental state associated with execution of the dynamic code sequence 610, a full capture of all or a portion of captured portion of environmental state is performed. It is then determined whether or not there are more code segments in the dynamic code sequence (decision block 314). In the case of FIG. 6, there are more code segments ("Yes" in decision block 314), and thus execution proceeds to the next code segment (act 316), which would be code segment 612 in FIG. 6.

The second code segment 612 is then executed (act 311). Suppose that all or a portion of the execution environmental state is to be captured ("Yes" in decision block 312), then all or a portion of the environmental state of the execution is captured (act 313) as that state existed after having completed execution of the second code segment. For instance, referring to FIG. 6, environmental state 622 is captured. In this case, since this was the second capture of environmental state associated with execution of the dynamic code sequence 610, a full capture of a captured portion of environmental state need not be performed. Instead, perhaps only an incremental capture 622 is captured. The incremental capture 622 captures the changes to the environmental state as compared to the prior capture 621, and thus may be much smaller than the full capture 621. Accordingly, the captured environmental state 622 is represented as being smaller than the captured environmental state 621 in FIG. 6. It is then determined whether or not there are more code segments in the dynamic code sequence (decision block 314). In the case of FIG. 6, there are more code segments ("Yes" in decision block 314), and thus execution proceeds to the next code segment (act 316), which would be code segment 613 in FIG. 6.

The third code segment 613 is then executed (act 311). Suppose now that environmental state is not to be captured ("No" in decision block 312) after execution of the code segment 613. In that case, no capture is made, but instead, it is then determined whether or not there are more code segments in the dynamic code sequence (decision block 314). In the case of FIG. 6, there are more code segments ("Yes" in decision block 314), and thus execution proceeds to the next code segment (act 316), which would be code segment 614 in FIG. 6. This example shows that in some embodiments, a capture need not made after execution of each code segment.

The fourth code segment 614 is then executed (act 311). Suppose that all or a portion of the execution environmental state is to be captured ("Yes" in decision block 312), then all or a portion of the environmental state of the execution is captured (act 313) as that state existed after having completed execution of the fourth code segment. For instance, referring to FIG. 6, environmental state 624 is captured. In this case, since this was not the first capture of environmental state associated with execution of the dynamic code sequence 610, a full capture of a captured portion of environmental state need not be performed. Instead, the capture may be an incremental capture 624. It is then determined whether or not there are more code segments in the dynamic code sequence (decision block 314). In the case of FIG. 6, there are more code segments ("Yes" in decision block 314), and thus execution proceeds to the next code segment (act 316), which would be code segment 615 in FIG. 6. The fifth code segment 615 is then executed, and processing proceeds until there are no more code segments in the dynamic code sequence to be executed ("No" in decision block 314), at which point execution may end (act 315).

Recall that FIG. 4 illustrates a flowchart of a method 400 of executing a dynamic code segment a subsequent time after environmental state has been captured. FIG. 4 will be described briefly with respect to FIG. 6. If the dynamic code sequence 610 were to be subsequently executed while the captured environmental state 621, 622 and 624 remains preserved, the environmental state may be set to be the same as the captured state exists before executing the code segment 615 (reference act 411). If the captured state 624 was a full capture, this process might not involve incremental analysis. However, if the capture state 624 was an incremental capture, then some differential analysis would be warranted to reconcile the captured state 624 with the previous full capture (e.g., full capture 621) and any intervening incremental captures (e.g., capture 622). Once the capture is used to set the environmental state, code segment 615 may be executed (reference act 412).

FIGS. 7A through 7D illustrate a particularly efficient way to perform the capture of the execution environment state (also referred to herein as the "execution context", which in the case of script may be referred to as "script context"). Referring to the environment 700A of FIG. 7A, the execution context 701 is illustrated as including two context components 711 and 712. The context component may be any subpiece of the execution context for which writes will be tracked against. As an example only, the context component might be an object, a collection of objects, a file, a collection of files, a set of properties within a single object, unique code paths through a routine, a code path based on an assumed value (or range of values) for a variable, or combinations thereof. Since the context component may be a dynamic object, the context components 711 and 712 will be hereinafter referred to as "dynamic object 711" and "dynamic object 712" although it will be appreciated in view of this description that the same principles may apply to any context component.

In the specific illustrated example, dynamic object 711 is illustrated as being a parent to dynamic object 712. Since this example will involve multiple instances (or incarnations since the instances may not be identical) of such dynamic objects, the dynamic object instances will hereafter have a suffix to denote the order of the execution context in which the dynamic object exists. For instance, the dynamic objects within the first execution context 701 will be referred to as instance 711(1) corresponding to dynamic object 711, and instance 712(1) corresponding to dynamic object 712.

This example is deliberately kept simple with a two object hierarchy so as not to obscure the general principles. However, the principles that will now be described may be extended to an execution context having any complexity of dynamic object hierarchies. Some dynamic programs may, for example, have hierarchies of hundreds or thousands of dynamic objects.

Each dynamic object may include potentially three distinct pieces. For instance, dynamic object 711 includes a component 721 that connects a schema component 722 to a slots component 723. The slots may be populated with values while the schema defines which object variable corresponds to which slot. In this description and in the claims, a "value" of a context component is not limited to literal values, but may include other state that might be associated with this context component. For instance, this technique could be applied to analyze code flow within a function in order to determine the type of a variable given a specific execution path through a function. In this case, on an assignment, the associated type of a variable may be altered based on the type information of the assigned item.

Together, these three components may be thought of as an object that has variables that can potentially be populated. In this example, the slot n of the parent dynamic object 711(1) references (and thus conceptually includes) the child dynamic object 712(1) as a value. The content of the elements 711 and 712 within FIGS. 7A through 7D is just an example, however, that is specific to dynamic objects, which is just an example of a context component for which writes may be tracked. The manner in which the context component holds data and appropriately organizes the data through a schema may depend on the nature of the context component, and is not important to the broader principles described herein.

Figure 7A:
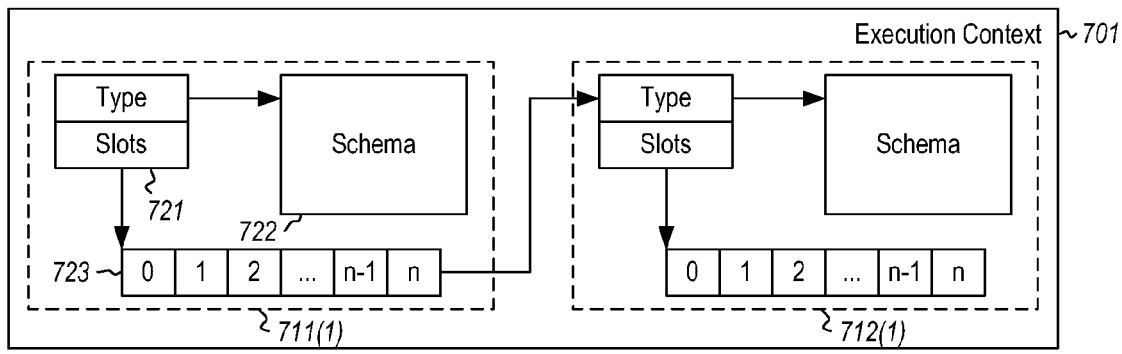
FIG. 7A illustrates a first execution context that includes a hierarchy of two context components.
Figure 7B:
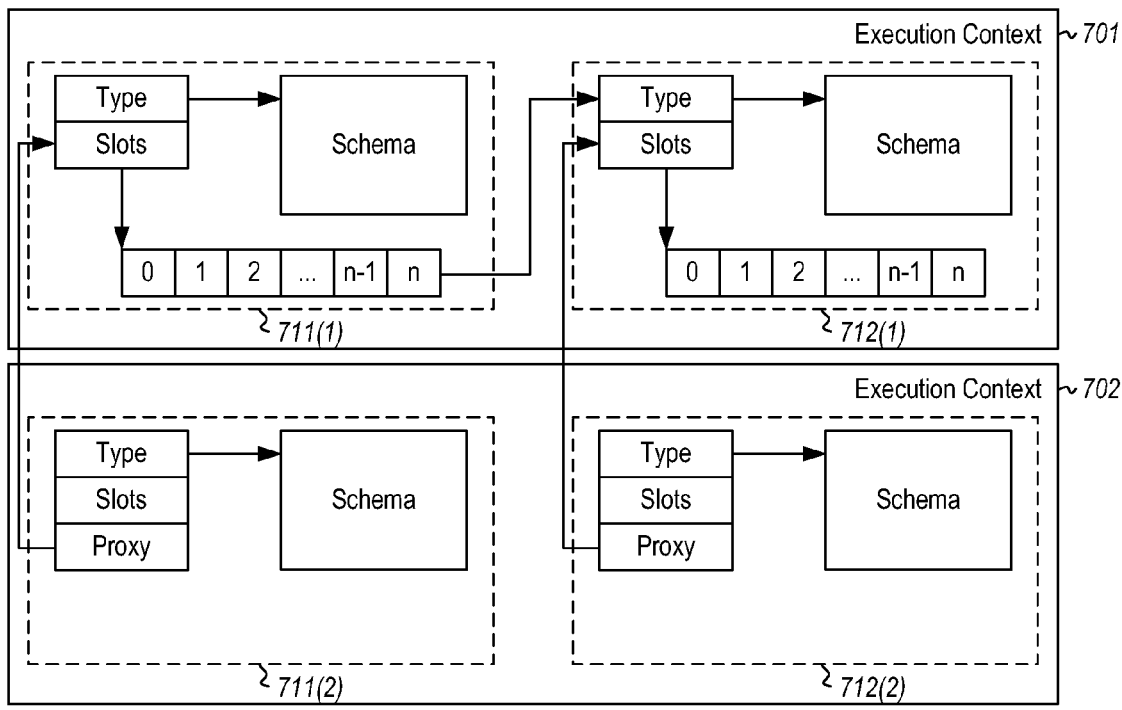
FIG. 7B illustrates two execution contexts in which the first represented a captured execution state and in which the second execution context is acted upon by executing code to read from both context components.

Referring to the environment 700B of FIG. 7B, when the execution context is to be "captured" (which term is to be interpreted broadly to include the embodiments to FIGS. 7A through 7D), the execution manager 601 may simply stop the executing code from being able to alter the state of the execution context 701, and create a new execution context 702 that the executing code may operate upon. Since the execution context 701 is no longer acted upon by the executing code, the execution context 701 may be considered to be a capture state of the execution environment.

As execution proceeds, instances of the dynamic objects 711(1) and 712(1) within the first execution context 701 are no longer acted upon. Furthermore, instances of the dynamic objects 711 and 712 are not necessarily created within the second execution context 702 unless they are referenced by the executing code. Also, the actual populated values of the dynamic object are not necessarily copied from the first execution context to the second execution context unless the executing code performs a write on the dynamic object. Thus, processing and memory usage associated with the capture operation may be deferred until demanded by the actions of the executing code. This may be a very powerful efficiency in cases in which there may be large hierarchies of dynamic objects, and in which a smaller number of dynamic objects are read from or written to after the capture is performed.

Suppose that the executing code references the parent dynamic object 711 for the first time after the capture is performed. An instance of the dynamic object 711(2) may be created in the second execution context 702. If the action is to be a read operation, then at this point, the slot values corresponding to slot component 723 still are not copied to the new instance of the dynamic object 711(2). Instead, the second instance 711(2) of the dynamic object 711 acts as a proxy to access the read values from the first instance 711(1) of the dynamic object 711.

Suppose further that the executing code references the child dynamic object 712 for the first time after the capture is performed. An instance of the dynamic object 712(2) may be created in the second execution context 702. If the action is to be a read operation, then at this point, the slot values still are not copied to the new instance of the dynamic object 712(2). Instead, the second instance 712(2) of the dynamic object 712 acts as a proxy to access the read values from the first instance 712(1) of the dynamic object 712.

Figure 7C:
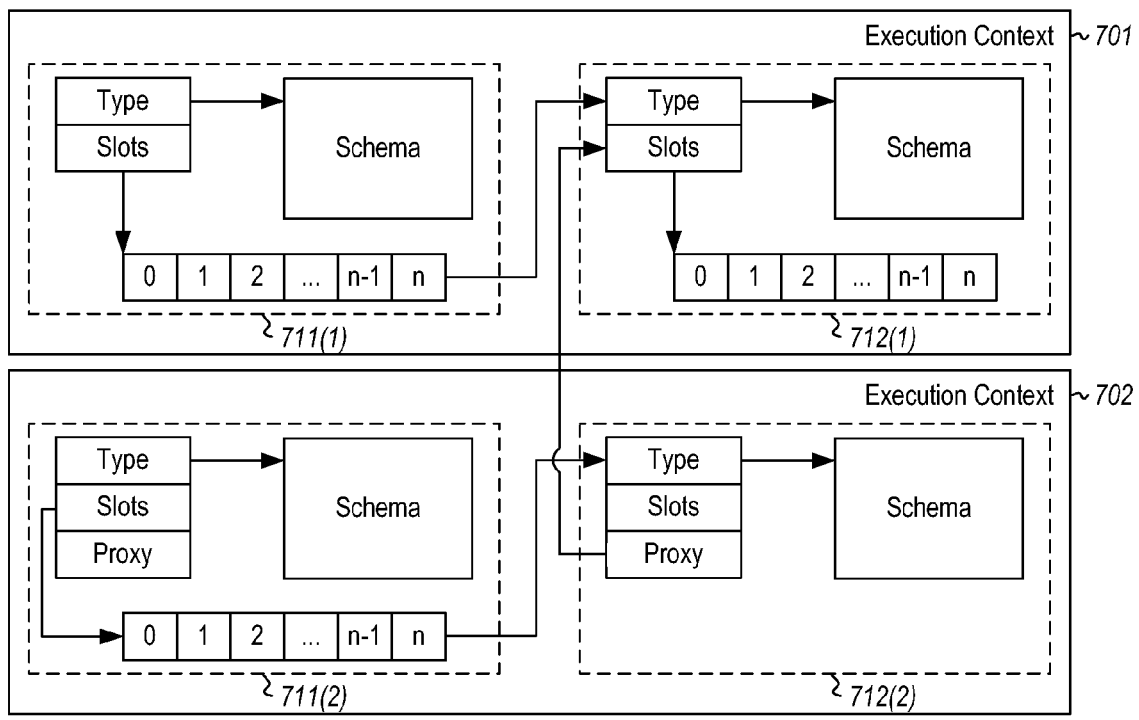
FIG. 7C illustrates two execution contexts in which the first represented a captured execution state and in which the second execution context is acted upon by executing code to write to one of the context components.

Referring to the environment 700C of FIG. 7C, suppose at this point that the executing code performs a write to the dynamic object 711 (but not to the dynamic object 712) for the first time since the capture. Since this is a write operation, the values from the first instance 711(1) of the dynamic object 711 are copied to the second instance 711(2) of the dynamic object 711. The value to be written as part of the write operation is then written to the second instance 711(2) of the dynamic object 711. Furthermore, the second instance 711(2) no longer acts as a proxy for the first instance 711(1) for future read operations. Thus, if the dynamic object 711 is later read from, it is the values in the second instance 711(2) of the dynamic object 711 that are read from, not the values of the first instance 711(1).

Figure 7D:
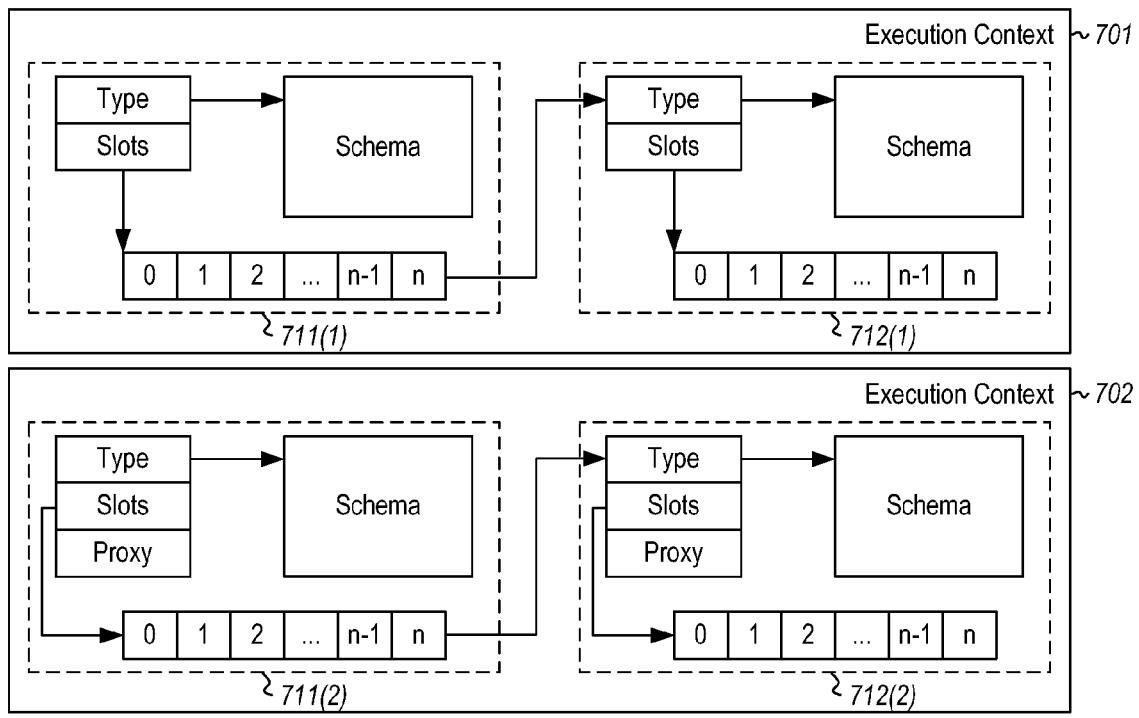
FIG. 7D illustrates two execution contexts in which the first represented a captured execution state and in which the second execution context is acted upon by executing code to write to both of the context components.

Referring to the environment 700D of FIG. 7D, suppose at this point that the executing code performs a write to the dynamic object 712 for the first time since the capture. Since this is a write operation, the values from the first instance 712(1) of the dynamic object 712 are copied to the second instance 712(2) of the dynamic object 712. The value to be written as part of the write operation is then written to the second instance 712(2) of the dynamic object 712. Furthermore, the second instance 711(2) no longer acts as a proxy for the first instance 712(1) for future read operations. Thus, if the dynamic object 712 is later read from, it is the values in the second instance 712(2) of the dynamic object 712 that are read from, not the values of the first instance 712(1).

This example showed a simple two object hierarchy, but the principles can be extended to any complexity of hierarchy and any type of context component as described above. The guiding principles are 1) that capture occurs by no longer allowing the executing code to affect a first instance of the execution context, 2) that thereafter that first execution context represents a state of the execution environment at the time the executing code stopped affecting the execution context, 3) that a second execution context is created for purposes of acting as an execution environment for the executing code as it continues to execute thereafter, 4) that proxy instances of the execution components in the first execution context are created in the second execution context when those execution components are read from, and 5) that values from the execution components in the first execution context are written to the second execution context upon a write operation being performed on the corresponding execution component, and thereafter the instance of the execution component in the second execution context are no longer acting as a read proxy for the corresponding instance in the first execution context.

The principles of FIGS. 7A through 7D may be further extended to beyond just one capture. For instance, suppose that a second snapshot of the execution context is to be taken. In that case a third execution context would be created. When performing a read operation on a particular third instance of a context component in the third execution context, if that third instance is not acting as a proxy instance, that means that the values from prior execution contexts have already been copied to the third instance of the context component, in which case the values may be read directly from the third instance. If the third instance is acting as a proxy instance and refers to a second instance of the context component in the second execution context, and that second instance is not acting as a proxy instance, then that means that the values may be obtained from the second instance of the context component and the third instance acts as a proxy to return those values. If the third instance is acting as a proxy instance and refers to a second instance of the context component in the second execution context, and that second instance is acting as a proxy instance, then that means that the values may be obtained from the first instance of the context component in the first execution context, and the second and third instances act as a proxy chain to return those values. These read principles may be applied to any number of execution contexts in a sequence of execution contexts.

When performing a write operation to the third instance, if the third instance is acting as a proxy instance, the values from the most recent instance of that context component that is not acting as a proxy are retrieved and copied to the third instance, and the third instance loses its proxy status for future read requests to that context component. These write principles may be applied to any number of execution contexts in a sequence of execution contexts.

These principles present a powerful way to leverage previously captured execution states. For instance, suppose that execution sequence ABCD was executed (segment A, followed by segment B, followed by segment C, and followed by segment D), and that a capture was performed after execution of each segment. Now suppose that segment ABEF is to be executed. Segments A and B are not executed. Rather the state after the previous execution of B is retrieved, and execution of segment E continues from there. Now suppose that segment AFGH is to be executed. Segment A is not executed again. Rather the state after the previous execution of A is retrieved, and execution of segment F continues from there.

Figure 8:
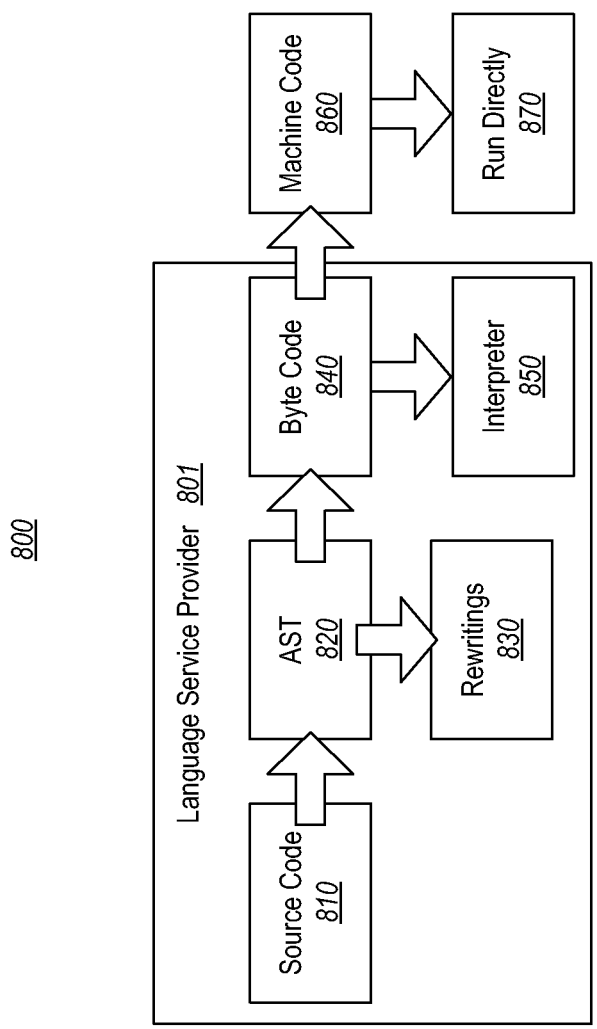
FIG. 8 illustrates an environment that includes a language service provider.

As previously mentioned, this capturing operation may be helpful during the authoring or evaluation of a dynamic language program as it allows for a halt point to be reached faster, thereby allowing an available symbol set to be generated based on an analysis of program state at the halt point. FIG. 8 illustrates an environment 800 in which a language service provider 801 generates such an available symbol set. The environment 800 also shows a certain flow in which some actions and program representations are handled within the language service provider 801, and some actions are handled outside the language service provider 801.

The language service provider begins its analysis with source code 810 of a dynamic language program being authored in its current authoring state (hereinafter referred to as the "current dynamic program"). The source code 810 may include the application context. The application context includes a description of the dynamic language program, an identifier for one or more specific locations within the dynamic language program, and runtime environment information. In some embodiments, the elements of the application context may be explicitly identified within the application context. In this way, different language service providers may interpret the schema of the application context, and provide their own processes for handling the elements of the application context.

The dynamic language program description could include, for instance, the source code of the dynamic language program. The runtime environment information may include system identification. This system identification may include an operating system identifier or a browser identifier. However, the system identification might also include a set of versions of environmental software (e.g., operating system or browser) in which the dynamic language program might operate. In this case, the language service provider might provide for a common subset of available APIs (that are common to all of the versions in the set) when executing the dynamic language program. The doc mode qualifies the available API's. In this way, a new browser version can provide backwards compatibility for mark-up written against previous versions.

The runtime environment information might also include a description of at least a portion of available external Application Program Interfaces (APIs), and type information for multiple variables in the dynamic language program.

The runtime environment might also include dependency information regarding whether and what execution resources the dynamic language program being authored depends on. As an example, perhaps the dynamic language program is not to be executed until another program executes.

In some embodiments, the dynamic language program description may simply be the file being authored or evaluated. In some embodiments, the dynamic language program description file could be the sole source of information regarding dependency information or other application context used to generate an available symbol set. This could include in-source comments that describe dependencies (such as utilization of an external framework library such as JQuery), dependencies that can be determined statically from actual code (such as dynamic insertion of a <script> element with a specific URL), and/or code that dynamically loads script which cannot be statically determined (described further below).

The dynamic language program description may also include other application code. Conceptually, this is code that is part of the application under development in that this application code is not an external dependency. This other application code may be in the form of files, and generally does not use special handling to acquire. This is because they are persisted and/or managed locally or as part of a storage mechanism for which the user has permissions. They also do not imply special handling in terms of security in that the code is trusted for execution. In some embodiments, application code is denoted by 1) its existence in an application project file (for environments that track project items and other configuration details in this way), 2) its presence in a specific directory/other writable location (for environments which construct a project based on the contents of a directory), and/or 3) an in-source reference to a file via a relative URL (in this case, the file should exist in the proper relative relationship wherever project files are persisted).

An application might refer to an external JS file (such as the JQuery framework). These files can be referenced in the same manner as application code, by in-source reference (as external URL), in a project file (again as an external URL), or requested during execution itself. Two related issues in files of this kind are that they are not trusted and are not internal to the machine. Merely requesting an external resource on the web can provoke certain types of security issues, so there may be settings and/or a user-driven approval process for performing the fetch. This downloading may be driven by user configuration.

There are several advantages to having these files cached locally. For instance, performance may be improved, may be made more deterministic, and this may allow more flexibility as far as sandboxing execution. The execution manager may identify unverified files that a user has downloaded from the internet and added to the project file, in contrast with an environment in which the downloaded code is simply trusted. On NTFS file systems, these files will be marked with a bit indicating they have been downloaded from the internet, in which case the execution manager could follow the same user experience as untrusted code (including removing the unsafe bit from the file if the user approves).

As for implied dependencies, there are several categories of callable API that are not expressed as code that is parsed/interpreted/executed by a runtime. These include 1) DOM API, 2) other external API, and 3) surrogate code. Each will now be explained.

As for DOM API, a significant portion of JavaScript executes in a browser environment, in which the browser/script host populates the execution environment with a large body of callable API (such as the window and document objects). This API varies by browser provider, by browser version, and by document doctype/docmode. For instance, an HTML document can be authored to explicitly force the document into a specific doc mode, which implies a specific available DOM API. In some embodiments, this implied callable DOM API is expressed as JavaScript that, when executed, populates the runtime with appropriate objects/methods.

As for other external APIs, any script host has the ability to extend callable API at runtime. Many execution environments also provide interoperability mechanisms (such as web services and COM activation) with implied API. These also can be provided in the system as executable JavaScript. Thus, system identification may include external APIs that are not native to the dynamic language runtime.

As for surrogate code, in some cases, for perhaps reasons of performance, convenience, or security, source code that exists and is actually parsed/executed in real world execution might be replaced by surrogate JavaScript code that can be executed in context of the language.

Absent a well-maintained and properly ordered set of in-source annotations describing a JS file's dependencies, an HTML file that consumes some JavaScript can be very helpful for determining references as well as proper ordering of file load (since any HTML file organizes its script elements properly in order for code to execute correctly). The execution manager permits JavaScript files to provide a reference to an HTML file that consumes it in order to identify what other JS code it might depend on and in what order they should load. This can save significant developer maintenance costs. HTML also can contain embedded code (e.g., within <script> elements or as embedded script associated with event handlers) that should be extracted and passed to the language service (since a file under edit might itself depend on this code). Finally, some browsers populate the JS callable API with variables that represent HTML elements expressed in the mark-up. In Internet Explorer, for example, any div marked with an id can be referred to from JavaScript directly by that id (rather than acquiring it via getElementById). For this case, the HTML would be parsed looking for elements with an ID and then construct surrogate JS that populates the global namespace with the appropriate set of identifiers.

These categories are useful for driving user experience/configuration, potentially dictate handling in the general framework itself and could imply special handling in a language service provider. Users might configure a project for a web application as targeting only a specific version of a browser. As mentioned, the infrastructure might treat external code with more care than trusted application code. When calculating a closure of dependencies that might be in play for editing a specific file, the infrastructure might also make decisions based on these categorizations. The downloader might not aggressively parse external files, for example, for a complete closure of its possible dependencies but depend instead on the hooks in the engine to identify when that external code itself pulls in other files.

The source code (along with its application context) is at least partially converted into an abstract syntax tree 820. An abstract syntax tree is a tree representation of the syntactic structure of the corresponding source code. Typically, each node in the abstract syntax tree represents a construct of the source code. For any given parent node (corresponding to a parent construct) that has children nodes (corresponding to children constructs), the children construct is a component construct within the parent construct, wherein the child construct and the parent construct have a particular relationship. Abstract syntax trees are known in the art, and thus will not be described in further detail herein. The definition of the term "abstract syntax tree" as used herein is not intended to differ from the ordinary and customary meaning of that term in the art.

However, unlike conventional abstract syntax trees, the abstract syntax tree 820 is subject to transformation by rewriting 830. The abstract syntax tree, whether transformed or not, may then be converted to byte code 840 and interpreted 850 by the language service provider 801. The language service provider 801 detects when execution reaches the halt point and constructs an available symbol set by analyzing program state at the halt point. The halting capability might be provided by a hook in the execution manager and/or using existing debugging services/capabilities provided alongside or as part of the execution manager.

Optionally, the byte code 840 may be converted to machine code 860, and such machine code 860 provided as output from the language service provider 801. The byte code 840 may then be directly executed 870 by the environment 800 outside of the language service provider 801 up to the halt point so that the available symbol set may be constructed by analyzing program state at the halt point.

As a dynamic language program is being authored, the dynamic language program may be executed a number of times at different stages of the authoring process. The method 900 of FIG. 9 may be performed at each of one or more of those different stages of the authoring process. Accordingly, when discussing the methods 900, reference to the dynamic language program will often use the modifier "current" (e.g., "current dynamic program") to represent that the method 900 is being performed on the dynamic language program at a particular arbitrary point in the authoring process.

Figure 9:
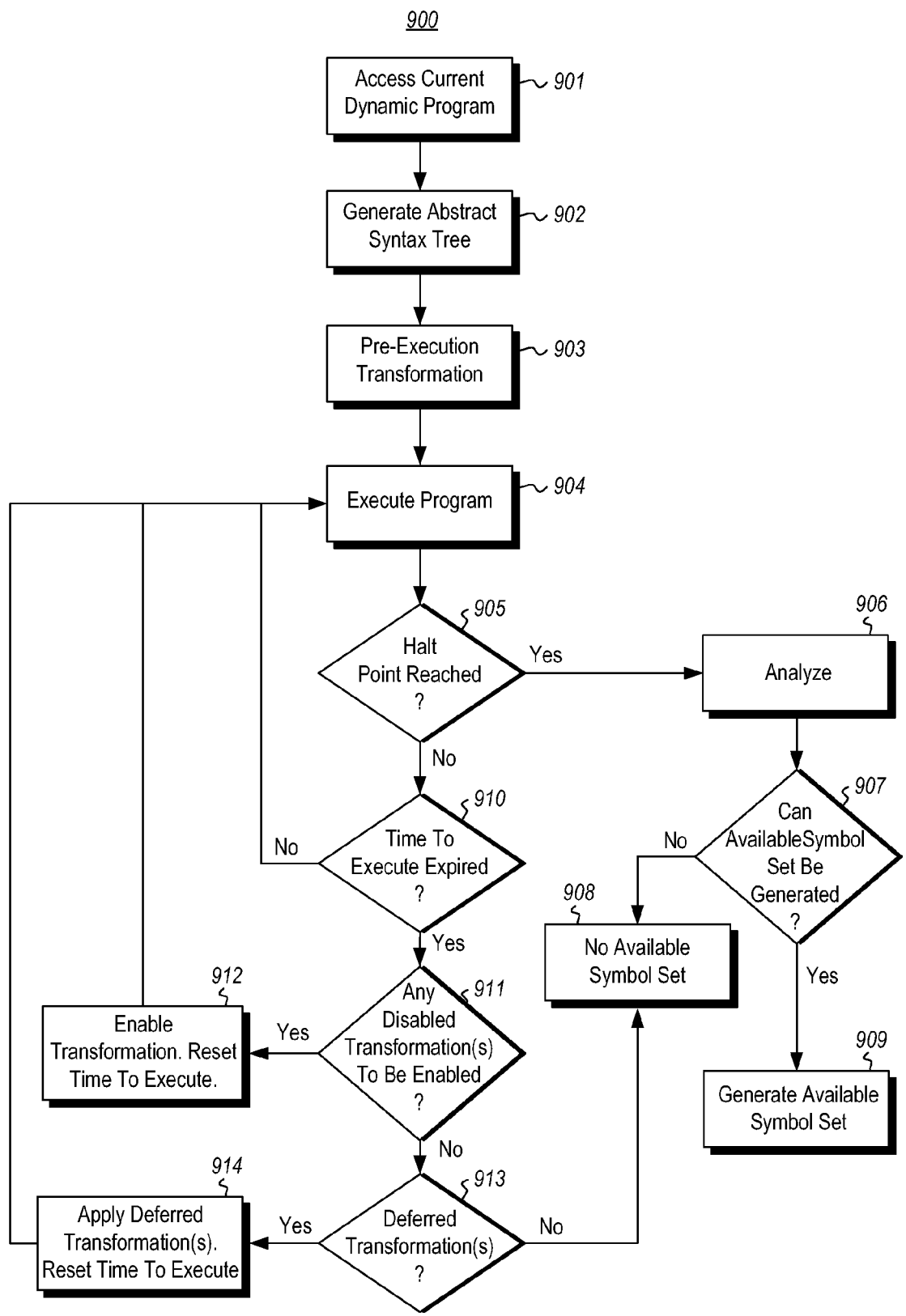
FIG. 9 illustrates a flowchart of a method for facilitating authoring or evaluation of a dynamic language program by transforming an abstract syntax tree.

FIG. 9 illustrates a flowchart 900 of a method 900 for facilitating authoring of a dynamic language program. The method 900 involves facilitating the authoring of a dynamic language program by transforming an abstract syntax tree. The dynamic language program may be, for example, the code segment 212 of FIG. 2, or perhaps the code segment 615 of FIG. 6, as examples.

According to the method 900 of FIG. 9, the current dynamic program is first accessed (act 901). As explained previously, the "current" dynamic program represents the dynamic language program as it exists at a particular arbitrary point in the authoring process, and perhaps even after authoring is complete and the correctness of the authored code is being evaluated. Referring to FIG. 8 as an example, the language service provider 801 accesses the source code 810. Although not required, the source code 810 may include source code as well as additional application context. For instance, the application context may reveal the dependencies of the entire dynamic code sequence 210 or 610, as well as containing captured environment state (e.g., capture state 221 or the combination of captured state 621, 622 and 624).

The abstract syntax tree is then generated that represents at least part of the source code (act 902). For instance, in FIG. 8, the language service provider 801 generates abstract syntax tree 820 based on the source code 810. At this point before execution, the language service provider may optionally modify the abstract syntax tree by considering the current dynamic program pre-execution (act 903). Potential reasons for such pre-execution modification of the abstract syntax tree will be described.

As a first example, a current dynamic program that is currently being authored or edited may not be entirely syntactically correct. For instance, the current dynamic program might not be parsed without some errors occurring. The language service provider may provide resilience in these cases, fixing up the code in a sensible way to permit execution to the identified specific point in the code for which the available symbol set is to be generated.

Furthermore, at this point, directed execution transformations may be made. The directed execution transformations are transformations that are made with the purpose of changing the course of execution in a determined way. Examples of further modifications that may be performed include 1)

forced conditional modifications in which the abstract syntax tree is modified such that a condition on a condition statement is forced to true, 2) loop guards that force a halting of at least one loop statement take too long to execute, and 3) a forced exit of a recursion in which the abstract syntax tree is modified to force an exit from a recursion faster than would otherwise occur without the modification.

In a particular embodiment, one or more of the directed execution transformations may be left disabled. In that case, the transformation may be later enabled without again performing an analysis of the application context to thereby later modify the abstract syntax tree. Instead, the transformation is enabled if needed. This may be particularly advantageous as it may not be necessary to ever enable the directed execution transformation. Modifying the course of execution through directed execution transformations may perhaps change the application state at the identified specific location, and thereby perhaps degrade the accuracy of the resultant available symbol set generated by analyzing that application state. Accordingly, by inserting disabled directed execution transformations before execution, the transformations may be made perhaps more efficiently, while leaving open the possibility that the directed execution will not have to be performed.

In one specific embodiment, only loop guard transformations are made at this point, and those loop guard transformations are left disabled. A loop guard forces a halting of at least one loop statement should that loop statement take a long time to execute. This helps in cases in which the halt point resides within a code portion whose execution is delayed by the loop statement. The term "loop statement" is meant to refer to any statement, regardless of language, which causes a code segment to be executed multiple times. Suppose, for example, that the abstract syntax tree originally represented the following source code:
while (a)
work( );

In other words, as long as condition a is met, then the function work will be repeatedly executed. This might prevent the halt point from ever being reached, or being reached in a timely manner. The abstract syntax tree may be modified to restrict the loop statement to a particular number of iterations.
while (a &&_lg1++<1000)
work( )

This may be referred to as a "loop guard" (represented as lg1 in the example) since the modification limits the number of times that the whole loop repeats.

Other than syntactical corrections, or directed execution, there may be other reasons to modify the abstract syntax tree even prior to execution. For instance, the abstract syntax tree of the dynamic language program may be altered such that authoring-time metadata is attached to a variable. Such authoring-time metadata might be useful specifically for the author in the context of the dynamic language program being authored.

For instance, the metadata might describe where the type of a variable was declared. However, a tracking value is generated earlier. If the variable is accessed but does not contain a value that would generate a useful symbol set (that is, it is null or undefined), and there is a metadata comment as described above, then a tracking value is created instead. It is treated during execution as the original value (either null or undefined) but is recognized as containing a value that should be used instead of the null or undefined. In this case, the abstract syntax tree could be modified to attach a value that is set once the variable definition is encountered during execution.

Once appropriate modification, if any, has occurred, the current dynamic program is executed (act 904). Referring to FIG. 8, execution of the current dynamic program is represented by action 850 in which case the byte code 840 is interpreted, or action 870 in which the machine code is directly executed by the environment 800 outside of the language service provider 801.

If, during execution (act 904), a halt point is reached ("Yes" in decision block 905), then the state of the current dynamic program may be analyzed as it exists at the halt point (act 906). In some cases, an available symbol set might not be able to be generated based on such analysis ("No" in decision block 907), in which case no available symbol set is generated (act 908). However, in some cases, and it is hoped most cases, an available symbol set can be generated based on such analysis ("Yes" in decision block 907), in which case the available symbol set is generated (act 909). In some embodiments, the language service provider may use the application context of the dynamic language program in order to generate the available symbol set.

If, during execution (act 904), a halt point is not yet reached ("No" in decision block 905), and the time to execute has not yet expired ("No" in decision block 910), then execution continues (act 904). If, during execution (act 904), a halt point has not been reached ("No" in decision block 905), and the time to execute has expired ("Yes" in decision block 910), then this indicates that execution may be taking too long to reach the halt point. The execution manager 601 may have explicit control over the control of this expiration timing. It may be a fixed amount of time that is already determined at the time that execution begins, or it may be a time that is adjusted as execution proceeds. The expiration time might be user configurable. The language service provider itself may perhaps have another expiration time, but this expiration time is not relied upon by the execution manager 601 in some embodiments.

Accordingly, at this point ("No" in decision block 905, and "Yes" in decision block 910), if there are pre-execution transformations that are not enabled ("Yes" in decision block 911), then the pre-execution transformations are enabled and the execution time is reset (act 912). For instance, in the case where the loop guards transformations were performed prior to execution (act 903), but were left disabled, those loop guard transformations may now be enabled (act 912). Execution may then be reattempted (act 904) with the aim to reach the halt point ("Yes" in decision block 905) before execution time expires ("Yes" in decision block 910).

If, however, time expires again ("Yes" in decision block 910), and if there are no further opportunities to enable more disabled pre-execution transformations ("No" in decision block 911), it is determined whether there are any deferred transformations that are to be applied to the abstract syntax tree (decision block 913). If there are no such deferred transformations ("No" in decision block 913), then the available symbol set is not generated (act 908). If there are such deferred transformations ("Yes" in decision block 913), then the abstract syntax tree is modified at that time, and the execution time is reset (act 914). For example, any of the example directed execution transformations enumerated above (such as forced conditionals, loop guards, forced recursion exit, or others) may be performed at act 914 instead of or in addition to being performed pre-execution at act 903. In one example, the loop guard transformations are added pre-execution, but disabled, and forced conditionals are deferred to act 914. This process continues until either no available symbol set is generated (act 908) or until an available symbol set is generated (act 909) (which it is hoped would be more common). Then execution is reattempted at act 904.

Accordingly, the principles described herein provide to improve execution of a dynamic code sequence by capturing execution state after execution of one or more of the code segments. In this manner, the captured state may be recovered when later executing the dynamic code sequence.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method by which a computing system executes a dynamic code segment sequence in an environment, the code segment sequence comprising a plurality of sequential code segments and the method comprising the following acts:
   executing a first code segment;
   capturing a first environmental state of a first instance of an execution context, the first environmental state representing a state of at least a portion of the first instance of the execution context after the execution of the first code segment is stopped;
   executing a second code segment;
   writing a second environmental state of a second instance of the execution context, wherein writing the second environmental state of the second instance of the execution context comprises performing the following for at least one context component in the first instance of the execution context:
      detecting that a read is to be performed on the at least one context component, and in response creating a proxy context component for the second environmental state of the second instance of the execution context, the proxy context component referencing the at least one context component as captured in the first environmental state of the first instance of the execution context;
      detecting that a write is to be performed on the at least one context component, and in response:
         copying values from the at least one context component as captured in the first environmental state of the first instance of the execution context to the proxy context component in the second environmental state of the second instance of the execution context;
         declassifying the proxy context component in the second environmental state of the second instance of the execution context as a proxy for said at least one context component; and
      performing the write on the copied values copied to the declassified proxy context component.

2. The method in accordance with claim 1, wherein the method is performed at authoring time.

3. The method in accordance with claim 2, wherein the method further comprises:
   an act of executing a third code segment until the third code segment encounters a halt point;
   an act of evaluating an environmental state of an execution context of the third code segment at the halt point; and
   an act of generating a completion list at the halt point as a result of the evaluation.

4. The method in accordance with claim 1, wherein the method is performed at deployment time.

5. The method in accordance with claim 4, wherein the method further comprises:
   an act of performing a static analysis of the captured first and second environmental states.

6. The method in accordance with claim 1, wherein the first environmental state is a full capture of the first instance of the execution context, and wherein the second environment state is also a full capture of the second instance of the execution context.

7. The method in accordance with claim 1, wherein the first environmental state is a full capture of the first instance of the execution context, and wherein the captured second environmental state of the second instance of the execution context comprises an updated capture of the execution context based on the second instance of the execution context as of completion of the second code segment's execution.

8. The method of claim 1, wherein the first code segment is a first dynamic language program, and the second code segment is a second dynamic language program.

9. A computer program product comprising one or more hardware memory devices having thereon computer-executable instructions that are structured such that, when executed the computer-executable instructions cause a computing system to execute a dynamic code segment sequence in an environment, the dynamic code segment sequence including a first code segment followed by a second code segment, wherein the execution of the dynamic code segment sequence comprises acts of:
   executing the first code segment;
   capturing a first environmental state of a first instance of an execution context, the first environmental state representing a state of at least a portion of the first instance of the execution context after the execution of the first code segment is stopped;
   executing the second code segment a first time;
   without re-executing the first code segment, setting the environment to the captured first environmental state and then beginning execution of the second code segment a second time;
   writing a second environmental state of a second instance of the execution context, wherein writing the second environmental state of the second instance of the execution context comprises performing the following for at least one context component in the first instance of the execution context:
      detecting that a read is to be performed on the at least one context component, and in response creating a proxy context component for the second environmental state of the second instance of the execution context, the proxy context component referencing the at least one context component as captured in the first environmental state of the first instance of the execution context;
      detecting that a write is to be performed on the at least one context component, and in response:
         copying values from the at least one context component as captured in the first environmental state of the first instance of the execution context to the proxy context component in the second environmental state of the second instance of the execution context;
         declassifying the proxy context component in the second environmental state of the second instance of the execution context as a proxy for said at least one context component; and
      performing the write on the copied values copied to the declassified proxy context component.

10. The computer program product in accordance with claim 1, wherein said captured first environmental state of the execution context comprises at least a first context component and a second context component, and wherein the first and second context components are dynamic objects, with the dynamic object of the first context component serving as a parent object in a hierarchy of dynamic objects to the dynamic object of the second context component.

11. The computer program product in accordance with claim 1, wherein the dynamic code segment also includes a previous code segment to be executed before the first code segment, and wherein execution of the dynamic code sequence further comprises:
   an act of executing the previous code segment; and
   an act of capturing an environmental state representing a state of the execution context which exists just before the first code segment executes.

12. The computer program product in accordance with claim 11, wherein the captured environmental state representing the state of the execution context which exists just before the first code segment executes is a full capture, and wherein the captured first environmental state is an updated capture of the captured environmental state representing the state of the execution context which exists just before the first code segment executes.

13. The computer program product in accordance with claim 12, wherein execution of the dynamic code sequence further comprises an act of combining the full capture with the updated capture.

14. The computer program product in accordance with claim 1, wherein the first code segment is a first dynamic language program, and the second code segment is a second dynamic language program.

15. The computer program product in accordance with claim 1, wherein the first code segment is a first script file, and the second code segment is a second script file.

* * * * *